United States Patent
Gomez et al.

(10) Patent No.: US 12,415,573 B2
(45) Date of Patent: Sep. 16, 2025

(54) OFF-ROAD VEHICLE WITH A DUAL-HINGE HOOD ASSEMBLY

(71) Applicant: CNH Industrial America LLC, New Holland, PA (US)

(72) Inventors: Lorenzo Gomez, New Holland, PA (US); Michael Braun, New Holland, PA (US); Doug Waco, New Holland, PA (US); Robert Neubauer, New Holland, PA (US); Russell Cederberg, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 364 days.

(21) Appl. No.: 18/080,070

(22) Filed: Dec. 13, 2022

(65) Prior Publication Data

US 2024/0190513 A1 Jun. 13, 2024

(51) Int. Cl.
- *B62D 25/10* (2006.01)
- *B60K 11/04* (2006.01)
- *B62D 25/08* (2006.01)
- *B62D 25/12* (2006.01)

(52) U.S. Cl.
CPC .............. *B62D 25/12* (2013.01); *B60K 11/04* (2013.01); *B62D 25/085* (2013.01); *B62D 25/10* (2013.01)

(58) Field of Classification Search
CPC ........ B62D 25/10; B62D 25/12; E02F 9/0891
See application file for complete search history.

(56) References Cited

U.S. PATENT DOCUMENTS

| | | | |
|---|---|---|---|
| 2005/0211483 A1* | 9/2005 | Pfohl | E02F 9/0866 180/68.1 |
| 2008/0006460 A1* | 1/2008 | Giovannini | E02F 9/00 180/69.2 |
| 2008/0185873 A1* | 8/2008 | Ayabe | B62D 25/10 296/193.11 |
| 2010/0031604 A1* | 2/2010 | Nakajima | E02F 9/00 52/750 |
| 2012/0325570 A1* | 12/2012 | Rogers | E02F 9/0891 29/525.11 |
| 2013/0074410 A1* | 3/2013 | Berkeland | E02F 9/0866 49/142 |
| 2013/0216344 A1* | 8/2013 | Uetake | E02F 9/0891 414/687 |
| 2016/0326719 A1* | 11/2016 | Matsumura | B62D 25/10 |
| 2018/0222532 A1* | 8/2018 | Waco | B62D 25/084 |
| 2020/0232184 A1* | 7/2020 | Iwamoto | B62D 25/10 |
| 2022/0105783 A1* | 4/2022 | Torii | E02F 3/325 |
| 2022/0314820 A1* | 10/2022 | Nakada | B60L 50/66 |
| 2024/0044105 A1* | 2/2024 | Miki | E02F 9/0866 |
| 2024/0190513 A1* | 6/2024 | Gomez | B60K 11/04 |

* cited by examiner

*Primary Examiner* — Gregory A Blankenship
(74) *Attorney, Agent, or Firm* — Foley & Lardner LLP

(57) ABSTRACT

An off-road vehicle includes a frame coupled to one or more tractive elements, a cab supported on the frame, and a hood assembly coupled to the frame. The hood assembly includes a first hood coupled to the frame by a first hinge assembly and a second hood coupled to the frame by a second hinge assembly. The first hood is configured to pivot about the first hinge assembly independent of the second hood, and the second hood is configured to pivot about the second hinge assembly independent of the first hood.

18 Claims, 11 Drawing Sheets

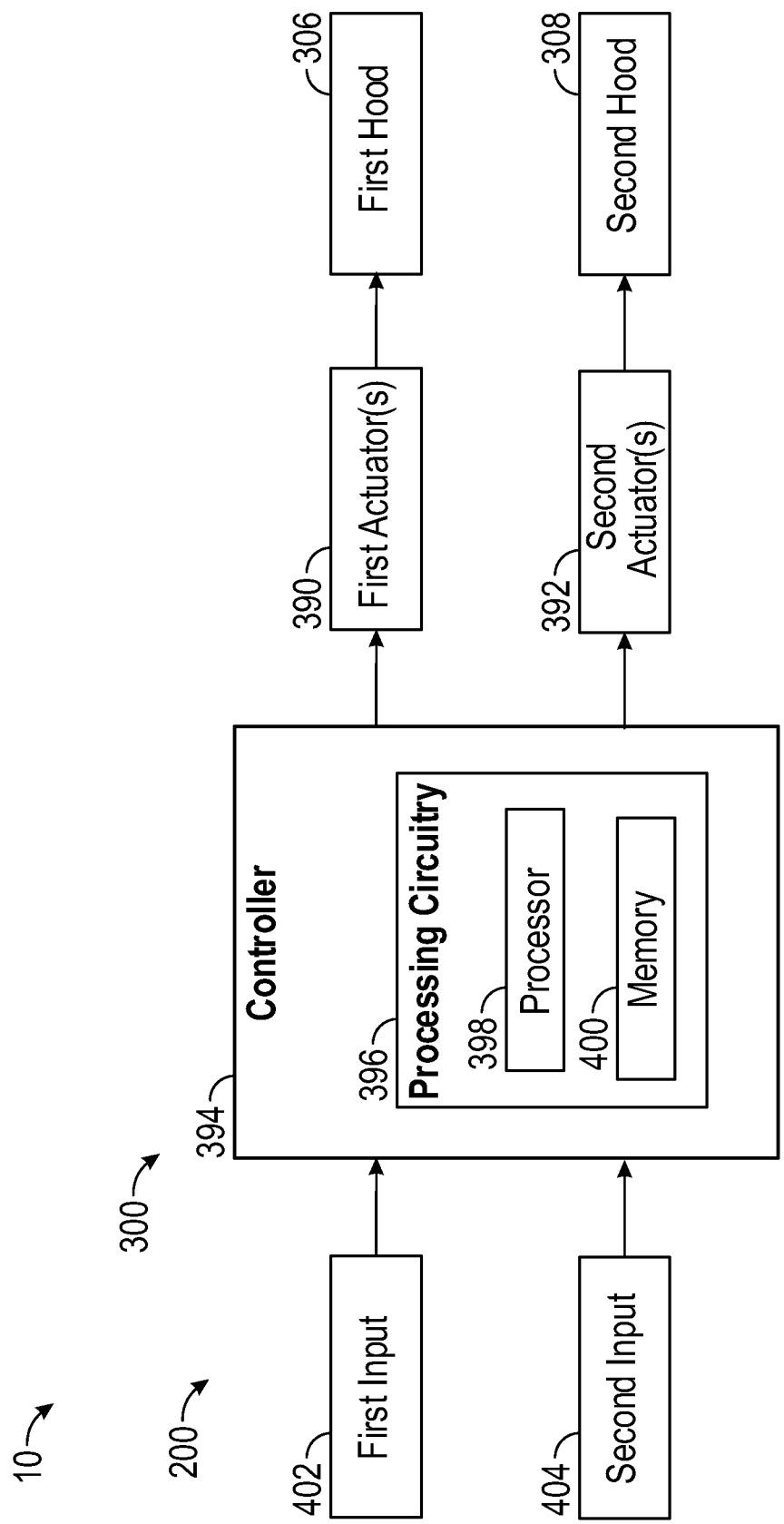

OFF-ROAD VEHICLE WITH A DUAL-HINGE HOOD ASSEMBLY

BACKGROUND

The present disclosure relates generally to a hood assembly. Typically, off-road vehicles, such as tractors, include a single hood that can be moved between a closed position where the hood covers or encloses components of the off-road vehicle (e.g., an engine, etc.) and an open position where access is provided to the components.

SUMMARY

One embodiment relates to an off-road vehicle. The off-road vehicle includes a frame coupled to one or more tractive elements, a cab supported on the frame, and a hood assembly coupled to the frame. The hood assembly includes a first hood coupled to the frame by a first hinge assembly and a second hood coupled to the frame by a second hinge assembly. The first hood is configured to pivot about the first hinge assembly independent of the second hood, and the second hood is configured to pivot about the second hinge assembly independent of the first hood.

Another embodiment relates to an off-road vehicle. The off-road vehicle includes a frame coupled to one or more tractive elements and defining a front end and a rear end, a cab supported on the frame, a cooling assembly arranged adjacent to the front end, an engine arranged between the cooling assembly and the cab, and a hood assembly coupled to the frame. The hood assembly includes a first hood pivotally coupled to the frame and configured to selectively cover the engine, and a second hood pivotally coupled to the frame and configured to selectively cover the cooling assembly.

Still another embodiment relates to an off-road vehicle. The off-road vehicle includes a frame coupled to one or more tractive elements, a cab supported on the frame, an engine bay defining a first section and a second section, and a hood assembly. The first section of the engine bay is arranged closer to the cab than the second section of the engine bay. The hood assembly includes a first hood and a second hood. The first hood is pivotally coupled to the frame so that the first hood is configured to selectively pivot between a first open position where access is provided to the first section and a first closed position where the first section is at least partially enclosed by the first hood. The second hood is pivotally coupled to the frame so that the second hood is configured to selectively pivot between a second open position where access is provided to the second section and a second closed position where the second section is at least partially enclosed by the second hood.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 14 is a block diagram of a controller of the vehicle of FIG. 4 in communication with one or more linear actuators, according to an exemplary embodiment.

DETAILED DESCRIPTION

Figure 1:
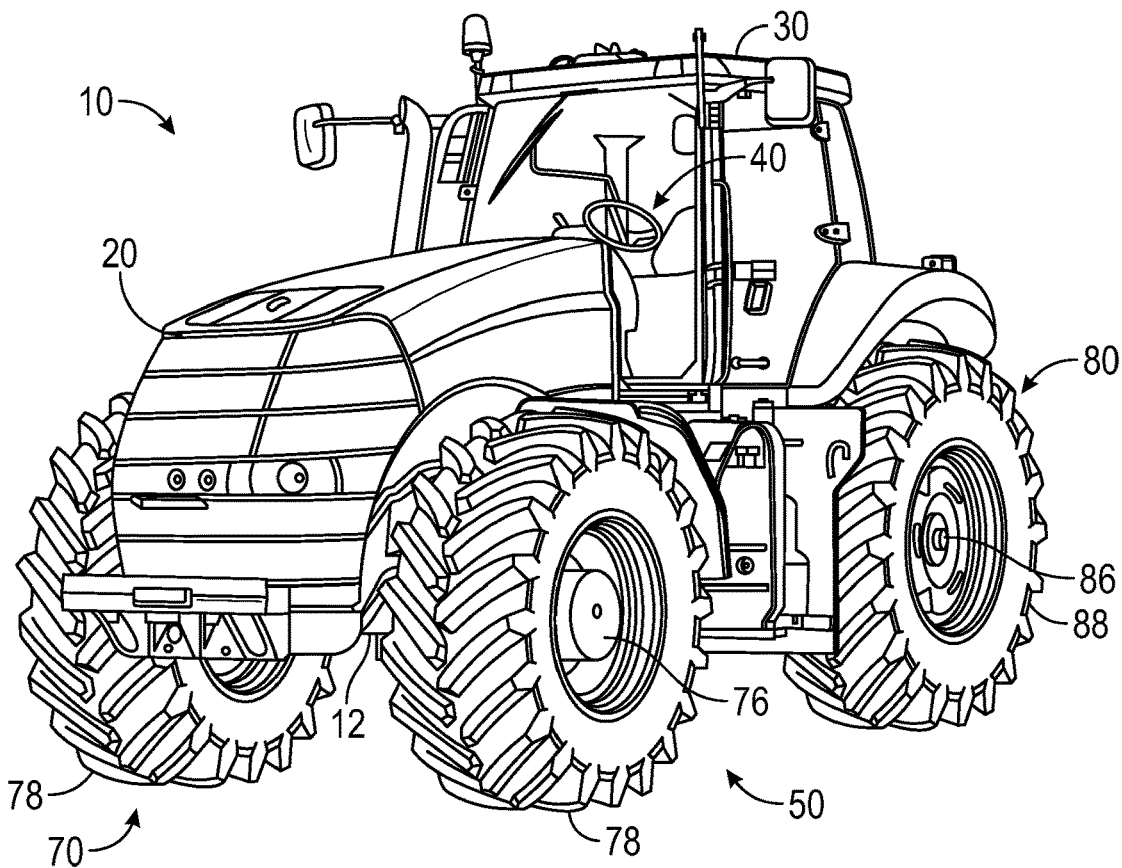
FIG. 1 is a perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

In general, industry trends for off-road vehicles (e.g., agricultural vehicles, constructions vehicles, tractors, etc.) are shifting toward larger hoods to accommodate increasing space requirements for engines and/or aftertreatment systems. With larger hoods, more robust opening systems are required (e.g., bigger castings, bigger springs, bigger struts, etc.) and the cost associated with supporting and opening the hood substantially increases. In addition, conventional hood designs typically utilize a single hood to cover an entire engine bay and the associated components arranged within the engine bay (e.g., an engine, cooling assembly, such as a radiator or fan, etc.). The use of a single hood induces a large lever arm when opening the hood and increases the force required to open the hood. Conventional off-road vehicles with a single hood typically require that the hood is reinforced with added material (e.g., plates, struts, springs, etc.) to enable the hood to withstand the increased opening forces exerted on the hood and to pass a hood slam test.

According to an exemplary embodiment, an off-road vehicle of the present disclosure includes a dual-hinge hood assembly having a first hood and a second hood. The first hood and the second hood are separately coupled to an off-road vehicle (e.g., to a frame of the off-road vehicle) so that the first hood and the second hood can pivotally open and close independently of one another. In general, the dual-hinge hood assembly distributes the weight that is traditionally defined by a single hood on conventional off-road vehicles over two independently operated hoods (i.e., the first hood and the second hood). Accordingly, the weight and the required opening force defined individually by the first hood and the second hood are substantially less than that of a single hood on a conventional off-road vehicle. In this way, for example, design of the components used to support the first hood and the second hood (e.g., hinges, struts, etc.) is simplified and the added robustness required by conventional single-hood designs is reduced or eliminated, both of which reduce the cost of the dual-hinge hood assembly when compared to conventional hoods.

In addition, the dual-hinge hood assembly allows selective access to different sections of an engine bay on an off-road vehicle. For example, the first hood may at least partially enclose a first section of an engine bay where an engine is installed, and the second hood may at least partially enclose a second section of an engine bay where a cooling assembly (e.g., a radiator, a fan, etc.) is installed. Because the first hood and the second hood are independently operable, a user may access one section of the engine bay (e.g., to perform service) and keep another section of the engine bay at least partially enclosed, which reduces the potential for contamination and debris entering the engine bay.

Overall Vehicle

Figure 2:
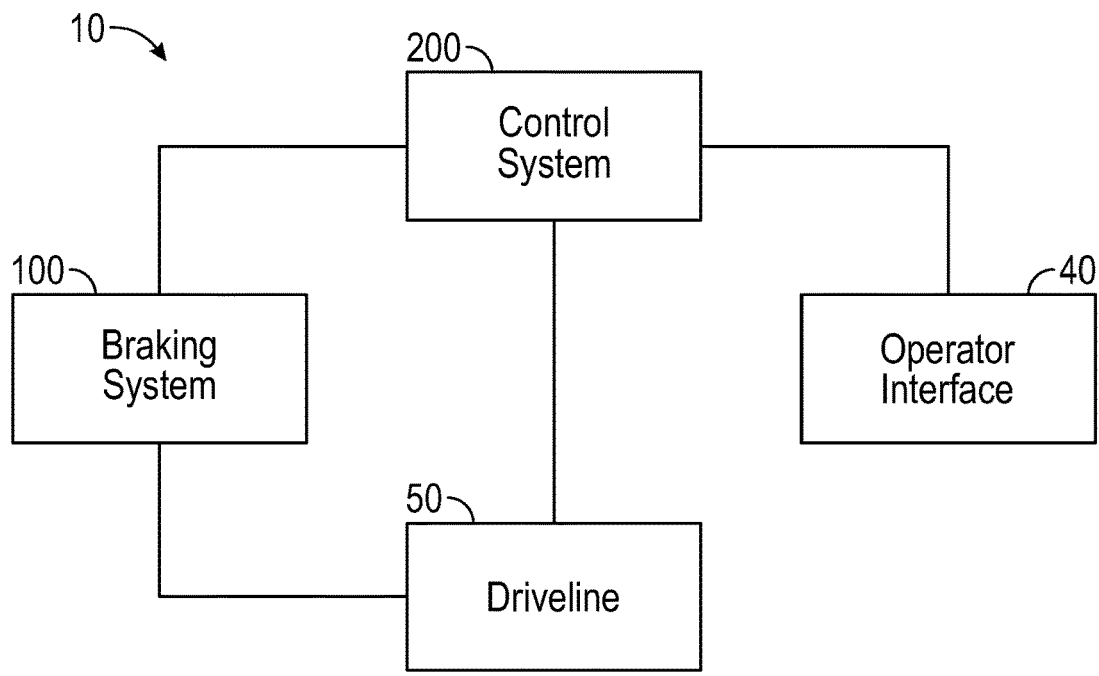
FIG. 2 is a schematic block diagram of the vehicle of FIG. 1, according to an exemplary embodiment.
Figure 3:
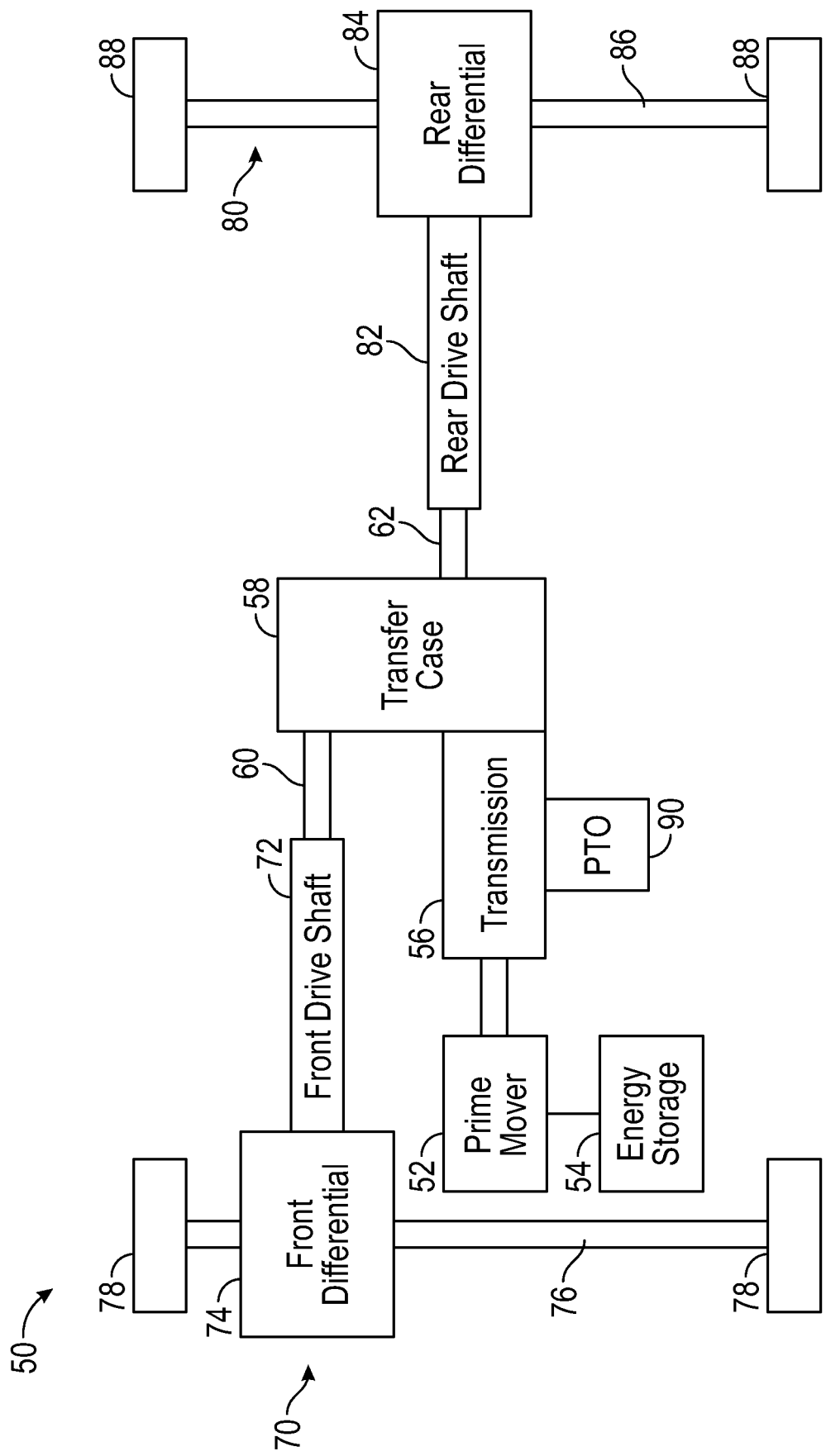
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

In general, the cab 30 is supported on the frame 12. According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

Dual-Hinge Hood Assembly

Figure 4:
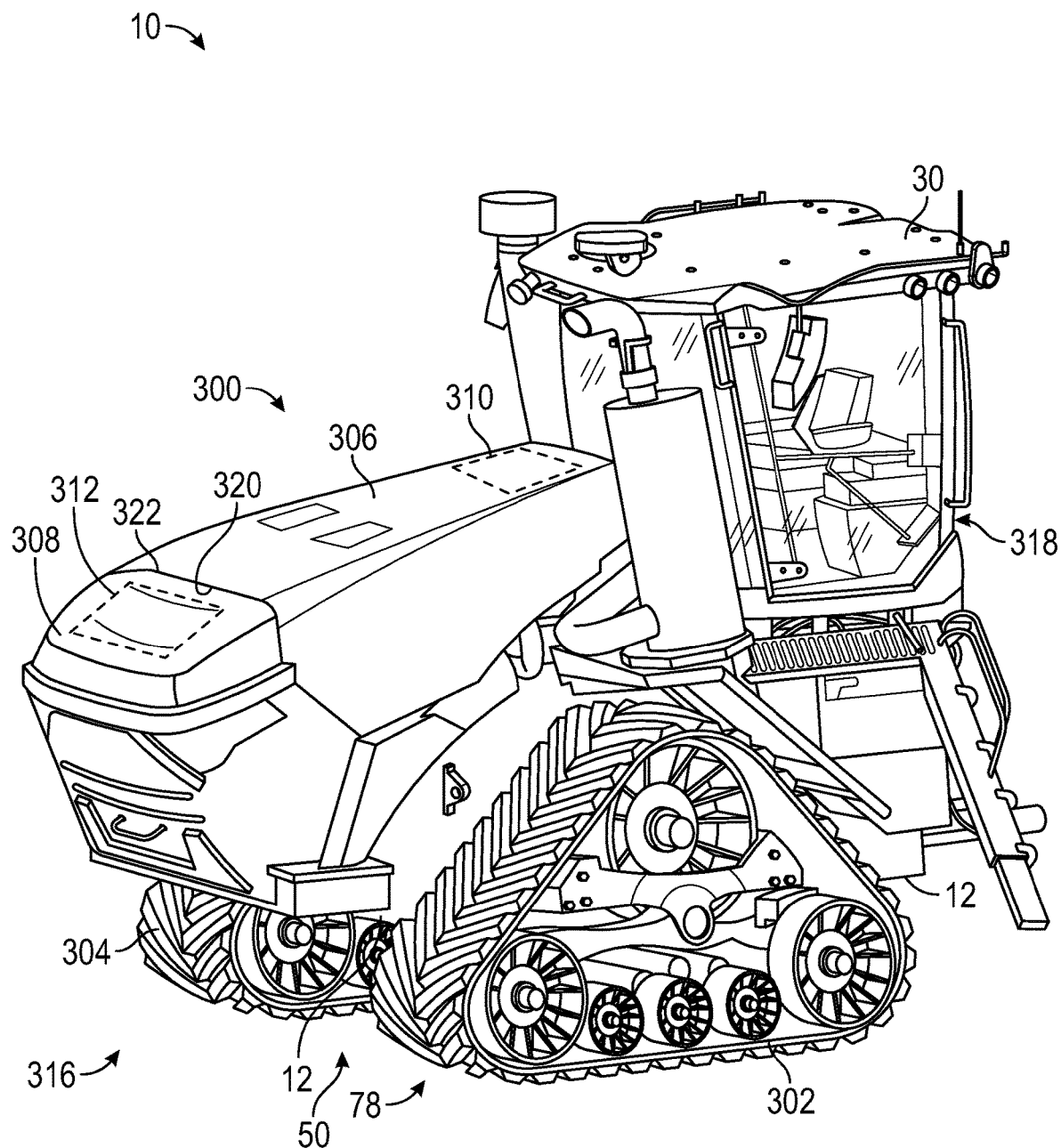
FIG. 4 is a perspective view of the vehicle of FIG. 1 including tracks and a dual-hinge hood assembly, according to an exemplary embodiment.
Figure 5:
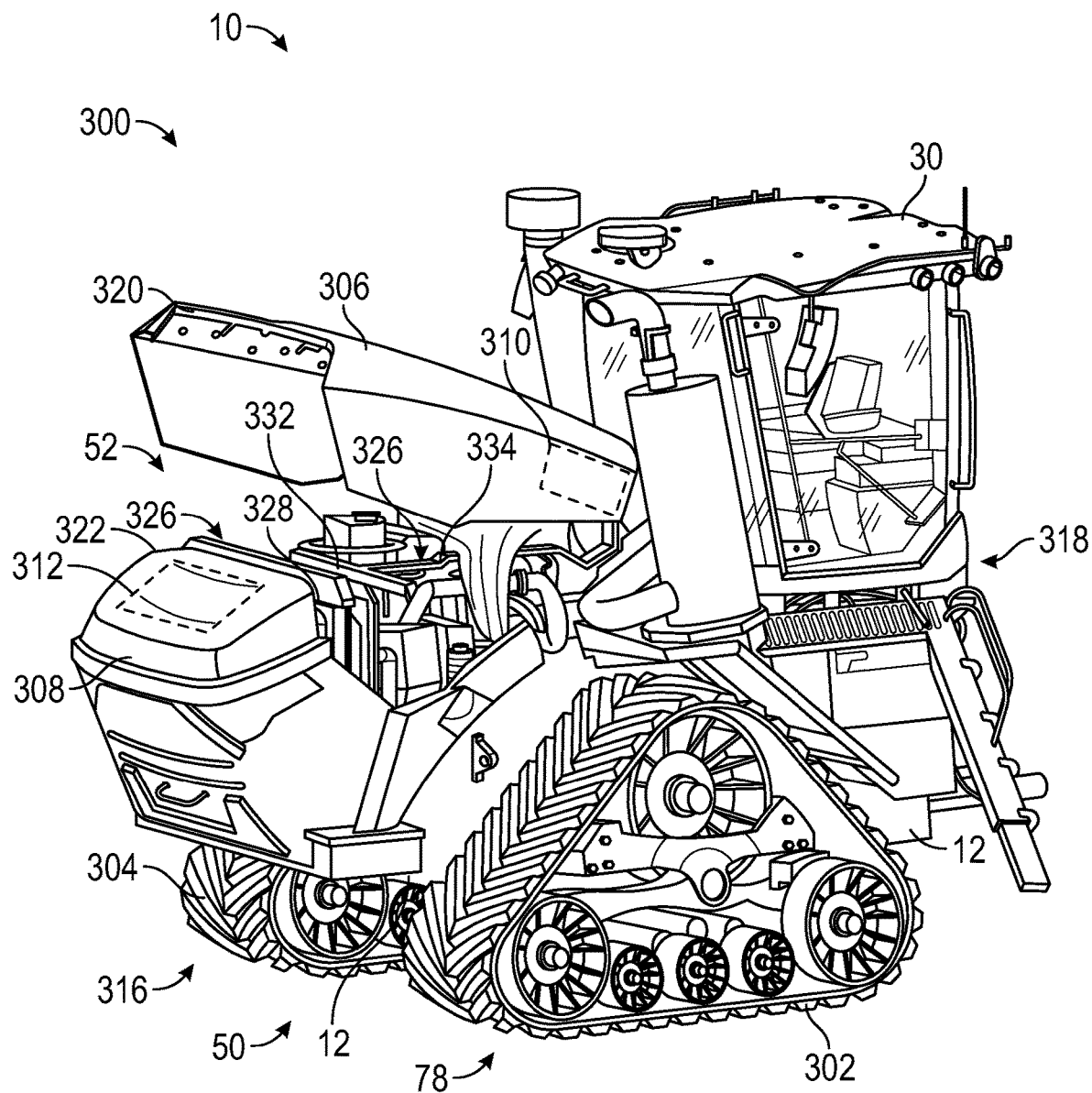
FIG. 5 is a perspective view of the vehicle of FIG. 4 with a first hood in an open position.
Figure 6:
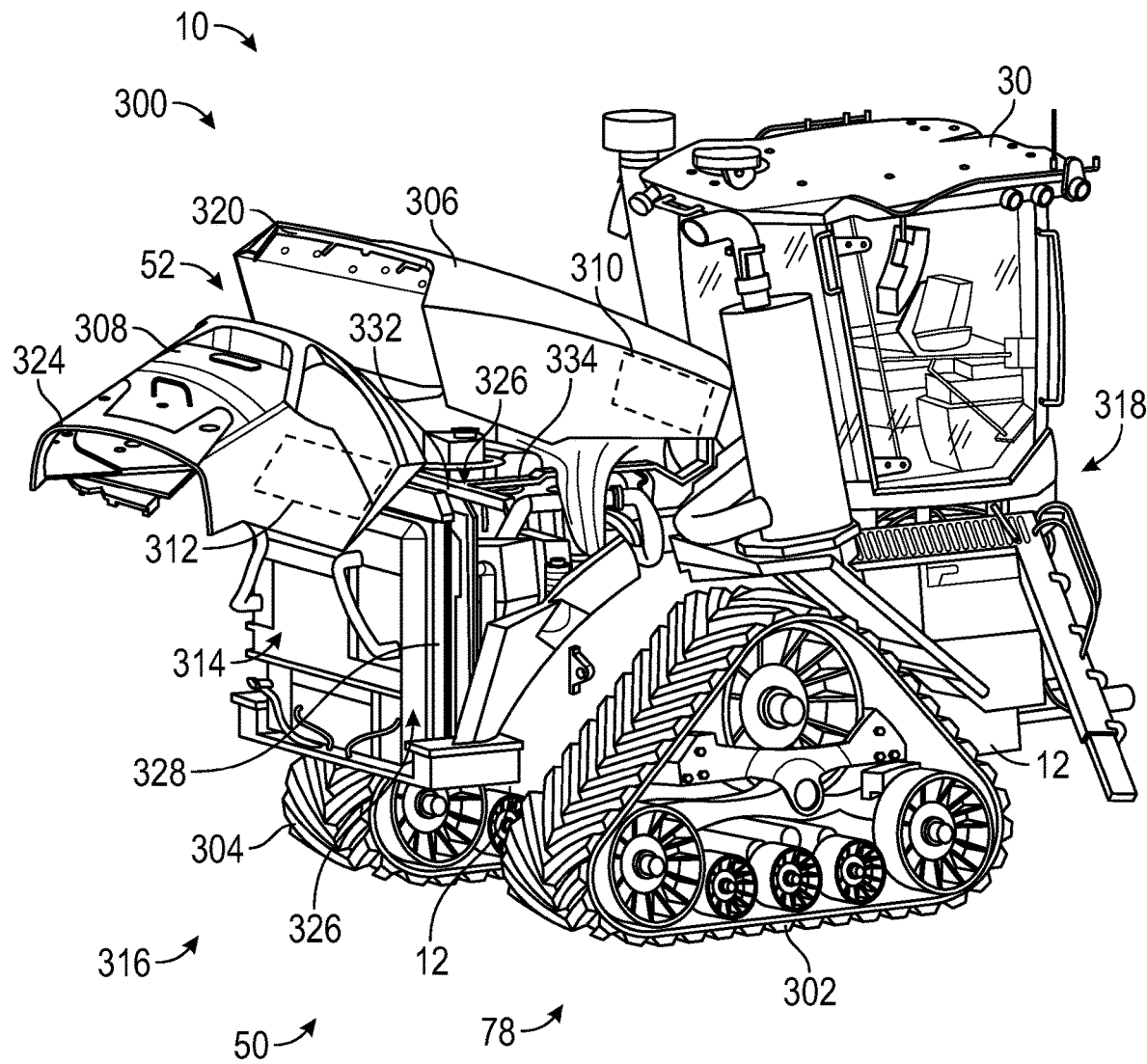
FIG. 6 is a perspective view of the vehicle of FIG. 4 with a first hood in an open position and a second hood in an open position.

FIGS. 4-6 illustrate an exemplary embodiment of the vehicle 10 (e.g., an off-road vehicle) including a dual-hinge hood assembly 300. In the illustrated embodiment, the front tractive elements 78 are structure in the form of a front left track 302 and a front right track 304, which may both be driven by the prime mover 52 (e.g., an internal combustion engine) to propel and move the vehicle 10. The front left track 302 and the front right track 304 are both coupled to the frame 12 (e.g., via one or more axles or linkages). In other words, the vehicle 10 includes a tractive assembly (i.e., the front left track 302 and the front right track 304) that is coupled to the frame 12. Although not shown, the vehicle 10 may include the rear tractive elements 88 structured in the form of a rear left track and a rear right track. In some embodiments, the vehicle 10 may include a tractive assembly including one or more wheels coupled to the frame 12 (see, e.g., FIG. 1).

In the illustrated embodiment, the hood assembly 300 is coupled (e.g., either directly or indirectly) to the frame 12 and includes a first hood 306 and a second hood 308. The first hood 306 is pivotally coupled to the frame 12 so that the first hood 306 is configured to selectively pivot between a first open position (see, e.g., FIGS. 5 and 6) and a first closed position (see, e.g., FIG. 4). Similarly, the second hood 308 is pivotally coupled to the frame 12 so that the second hood 308 is configured to selectively pivot between a second open position (see, e.g., FIG. 6) and a second closed position (see, e.g., FIGS. 4 and 5). As will be described herein, the first hood 306 is coupled to the frame 12 by a first hinge assembly 310 and the second hood 308 is coupled to the frame 12 by a second hinge assembly 312, The first hinge assembly 310 and the second hinge assembly 312 enable the pivotal movement of the first hood 306 and the second hood 308, respectively, relative to the frame 12.

In general, the hood assembly 300 provides selective access to two different sections of the off-road vehicle 10 that would typically be covered by a single hood on a conventional off-road vehicle. For example, the first hood 306 is configured to pivot about the first hinge assembly 310 independent of the second hood 308, and the second hood 308 is configured to pivot about the second hinge assembly 312 independent of the first hood 306. In this way, the first hood 306 can be opened and/or closed without altering a state of the second hood 308, and the second hood 308 can be opened and/or closed without altering a state of the first hood 306. This allows a user to selectively open one of the first hood 306 or the second hood 308 to perform service, maintenance, or otherwise access a specific component of the vehicle 10, while leaving one of the first hood 306 or the second hood 308 closed, which reduces the chance of debris entering the area under the hood assembly 300.

In the illustrated embodiment, the first hood 306 is configured to selectively cover the prime mover 52, which is in the form of an internal combustion engine, and the second hood 308 is configured to selectively cover a cooling assembly 314. That is, the first hood 306 is configured to selectively move between the first open position where access is provided to the engine 52 and the first closed position where the engine 52 is at least partially enclosed by the first hood 306. The second hood 308 is configured to selectively move between the second open position where access is provided to the cooling assembly 314 and the second closed position where the cooling assembly is at least partially covered by the second hood 308. In some embodiments, the cooling assembly 314 is in the form of a radiator, a fan, or another cooling component configured to provide cooling to an engine, a battery, or a flow of fluid (e.g., water, oil, etc.).

The cooling assembly 314 is arranged at a front end 316 of the frame 12, and the cab 30 is supported on a rear end 318 of the frame 12. The engine 52 is arranged between (e.g., moving along a longitudinal direction, or a direction parallel to a travel direction, defined by the vehicle 10) the cooling assembly 314 and the cab 30. In the illustrated embodiment, the second hood 308 is arranged adjacent to the front end 316, and the first hood 306 is arranged between (e.g., moving along a longitudinal direction, or a direction parallel to a travel direction, defined by the vehicle 10) the second hood 308 and the cab 30. In other words, the first hood 306 is arranged closer to the cab 30 than the second hood 308. Similarly, in the illustrated embodiment, the first hinge assembly 310 is arranged closer to the cab 30 than the second hinge assembly 312.

In some embodiments, a seal is formed around an outer periphery of at least a portion the first hood 306 and at least a portion of the second hood 308. For example, a seal may be formed at an interface between the first hood 306 and the second hood 308 (i.e., any area or region that overlaps between the first hood 306 and the second hood 308) so that the combination of the first hood 306 and the second hood 308 provide sealing performance similar to a single-piece hood. To form a seal at the interface between the first hood 306 and the second hood 308, the shape defined by the interfacing portions of the first hood 306 and the second hood 308 are complementary so that a nested arrangement is formed when both the first hood 306 and the second hood 308 are in the closed position. For example, a shape defined by a first interfacing portion 320 of the outer periphery of the first hood 306 is complementary to a second interfacing portion 322 of the outer periphery of the second hood 308. In some embodiments, the seal provided at the interface between the first hood 306 and the second hood 308 is formed by a gasket (e.g., a foam gasket, a rubber gasket, etc.) mounted to the first interfacing portion 320 and/or to the second interfacing portion 322.

In addition to the seal formed at the interface between the first hood 306 and the second hood 308, the second hood 308 may further provide a seal around a remaining portion of the outer periphery thereof. That is, a lower portion 324 of the outer periphery of the second hood 308 may include or engage with a seal that forms between the lower portion 324 and the frame components that interface with the lower portion 324. In general, the second hood 308 defines a volume of material that is substantially less than a single-piece hood on a conventional off-road vehicle. The reduced amount of material, and general smaller size and weight of the second hood 308, enables the tighter tolerances for the fit between the outer periphery of the second hood 308 and both the surrounding frame components and the interference with the first hood 306. The tighter tolerances provide a closely-fitting, more robust seal that can be be formed around the outer periphery of the second hood 308, when compared to a single-piece hood on a conventional off-road vehicle.

In the illustrated embodiment, the second hood 308 is arranged on an upstream side of the cooling assembly 314. That is, air flow into the cooling assembly 314 travels through the second hood 308 and then into the cooling assembly 314, so the cooling assembly 314 is arranged upstream of (in a direction opposite to the direction of flow) the cooling assembly 314. In general, the upstream side of the cooling assembly 314 requires a more robust seal to prevent debris from flowing into the cooling assembly 314. As described above, the design and incorporation of the second hood 308 enables a better seal to be formed around the outer periphery of the second hood 308, which aids in maintaining a cooling efficiency/performance of the cooling assembly 314 by reducing or preventing the influx of debris.

The first hood 306 is arranged on a downstream side of the cooling assembly 314. That is, air flow out of the cooling assembly 314 travels through the first hood 306 (e.g., through an internal volume defined under the first hood 306), so the first hood 306 is arranged downstream of (in the same direction as the direction of air flow) the cooling assembly 314. To provide effective cooling, it is typically desirable to allow the air flow downstream of the cooling assembly 314 to escape to the atmosphere. The first hood 306, like the second hood 308, defines a volume of material that is substantially less than a single-piece hood on a conventional off-road vehicle. The reduced amount of material, and general smaller size and weight of the first hood 306, enables tighter tolerances for the fit between the outer periphery of the first hood 306 and both the surrounding frame components and the interference with the second hood 308. It follows that the outer periphery of the first hood 306 may be designed with a variable seal that provides strong sealing performance at the interface between the first hood 306 and the second hood 308, and allows air flow downstream of the cooling assembly 314 to efficiently escape to the atmosphere at the interface between the first hood 306 and the surrounding frame components.

In the illustrated embodiment, the cooling assembly 314 is mounted to a cooling assembly frame 326 (see, e.g., FIG. 6). The cooling assembly frame 326 includes a cooling plate 328 that is coupled to and supported on the frame 12. In some embodiments, the cooling plate 328 is coupled to a support beam 330 that includes a lateral portion 332 and a longitudinal portion 334. The lateral portion 332 extends laterally (e.g., perpendicular to the longitudinal direction, or perpendicular to the travel direction of the vehicle 10) along a top side of the cooling plate 328, and the longitudinal portion 334 extend longitudinally back toward the cab 30. The lateral portion 332 is coupled to the cooling plate 328 and the longitudinal portion 334 is coupled to the frame 12, or to a structural member or bracket that is coupled to the frame 12. The combination of the cooling plate 328 and the support beam 330 form a support loop that extends about the frame 12 and provides support, for example, to the first hood 306, the second hood 308, the first hinge assembly 310, and the second hinge assembly 312. For example, the support loop extends from the front end 316 of the frame 12 at the location where the cooling plate 328 is coupled to the frame 12, upward along the cooling plate 328 to the support beam 330, and then along the support beam 330 and back to the frame 12 at a location adjacent to the cab 30.

Figure 7:
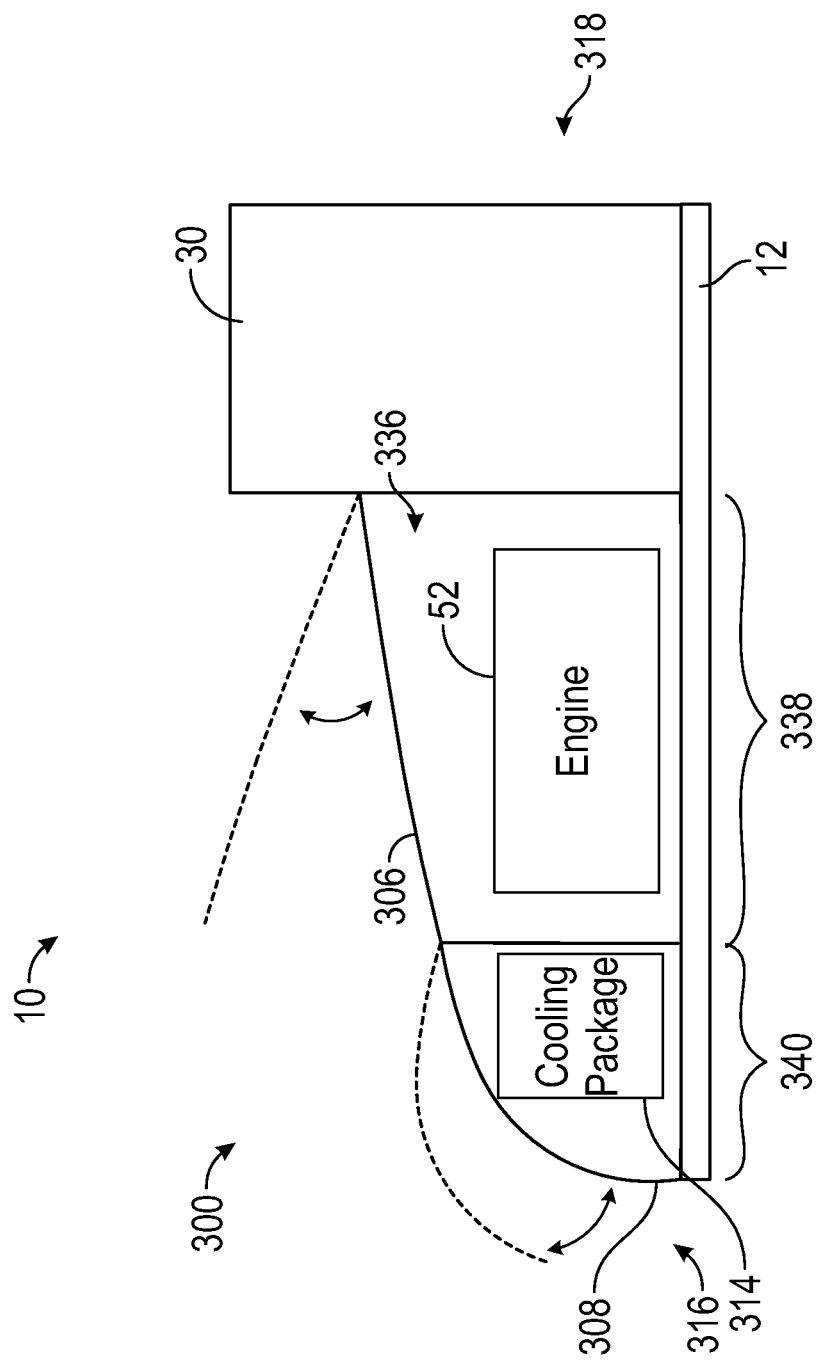
FIG. 7 is a schematic illustration of a side view of the vehicle of FIG. 4 with a first hood and a second hood opening in the same direction.
Figure 8:
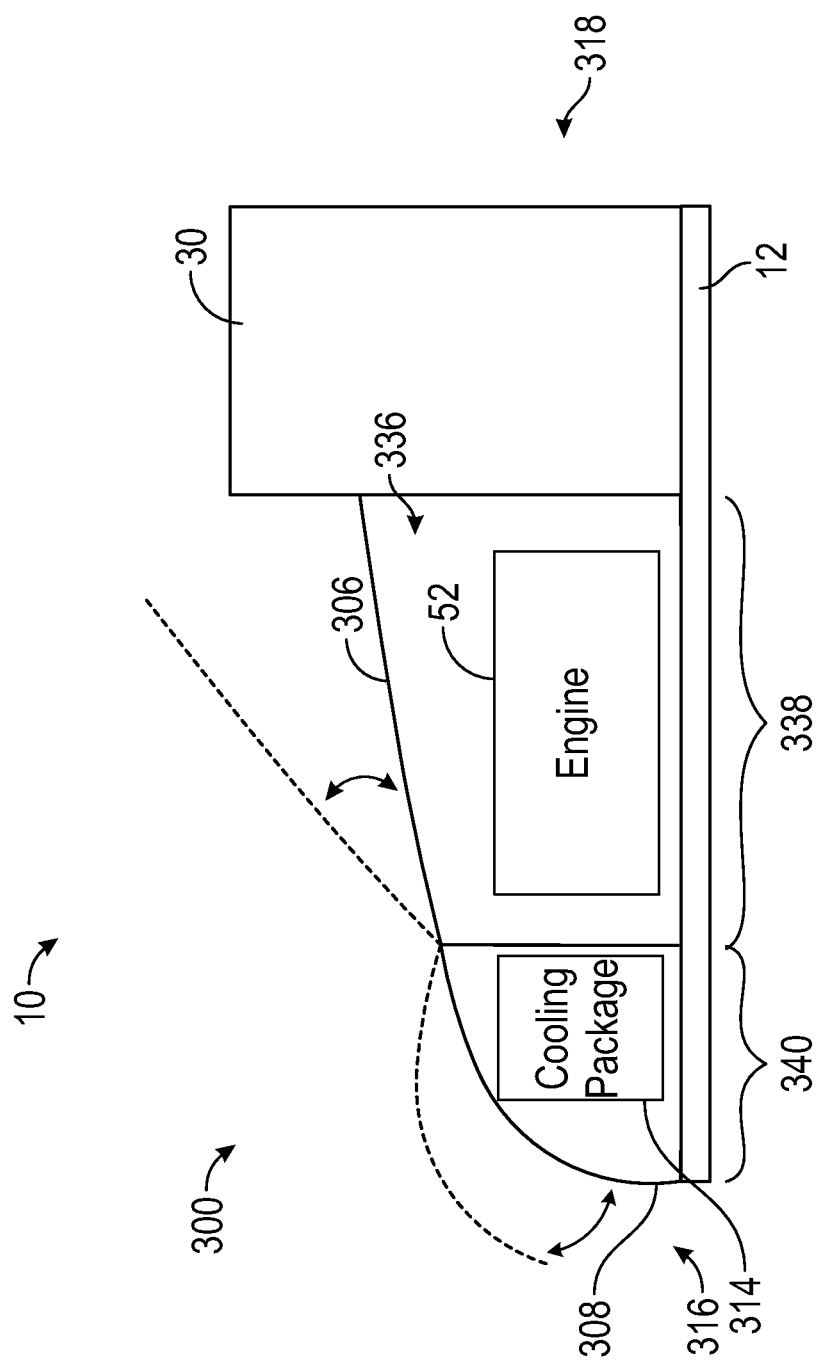
FIG. 8 is a schematic illustration of a side view of the vehicle of FIG. 4 with a first hood and a second hood opening in opposite directions.

Turning to FIGS. 7 and 8, the vehicle 10 includes an engine bay 336 that can be defined as the area or volume under the hood assembly 300 within which the engine 52 and other components of the vehicle 10 (e.g., the cooling assembly 314) are mounted. In the illustrated embodiment, the engine bay 336 defines a first section 338 and a second section 340. The first section 338 is arranged closer to the cab 30 than the second section 340 and houses the engine 52. The second section 340 houses the cooling assembly 314. Accordingly, the first hood 306 is configured to selectively pivot between the first open position (shown in dashed lines in FIGS. 7 and 8) where access is provided to the first section 338 and the first closed position where the first section 338 is at least partially enclosed by the first hood 306. The second hood 308 is configured to selectively pivot between the second open position (shown in dashed lines in FIGS. 7 and 8) where access is provided to the second section 340 and the second closed position where the second section 340 is at least partially enclosed by the second hood 308. During operation, the hood assembly 300 selectively provides access to two different sections of the engine bay 336 (i.e., the first section 338 or the second section 340) and the components mounted therein, which negates the need to expose the entire engine bay 336 for maintenance or service, like single-piece hoods on conventional off-road vehicle.

In the illustrated embodiments of FIGS. 4-7, the first hood 306 and the second hood 308 are configured to pivot in the same direction (e.g., clockwise from the perspective of FIGS. 4-7) when pivoting from the closed position to the open position. In some embodiments, as shown in FIG. 8, the first hood 306 and the second hood 308 are configured to pivot in opposing directions. For example, the first hood 306 may pivot in a first direction (e.g., clockwise from the perspective of FIG. 8) when pivoting from the first closed position to the first open position, and the second hood 308 may pivot in a second direction (e.g., counterclockwise from the perspective of FIG. 8), which is opposite to the first direction, when pivoting from the second closed position to the second open position. In this embodiment, the first hinge assembly 310 may be arranged further from the cab 30 in a direction toward the front end 316. For example, the first hinge assembly 310 may be coupled to the cooling assembly frame 326 or the lateral portion 332 of the support beam 330.

Figure 9:
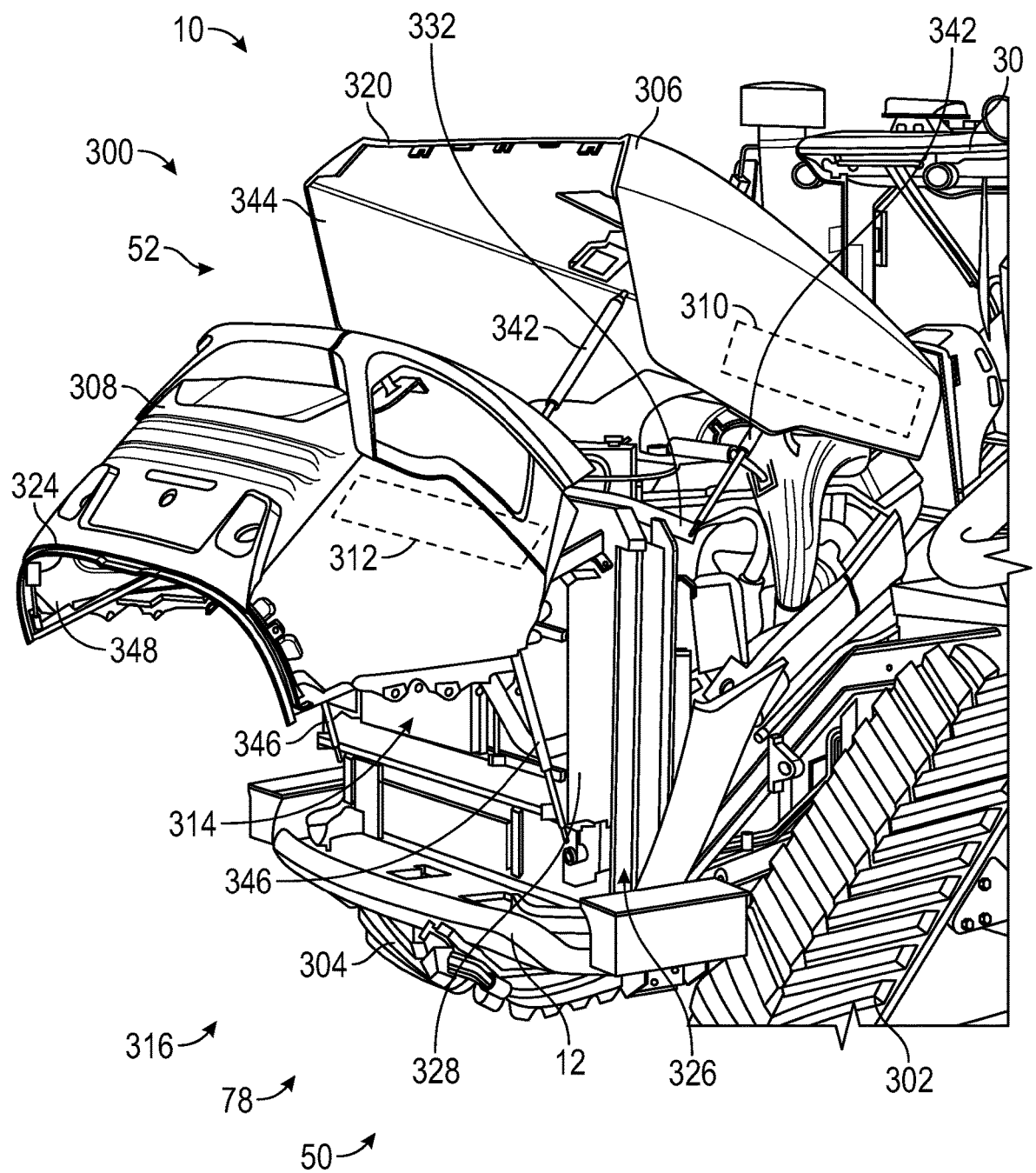
FIG. 9 is a perspective view of the vehicle of FIG. 6 with gas struts coupled to the first hood and the second hood.
Figure 10:
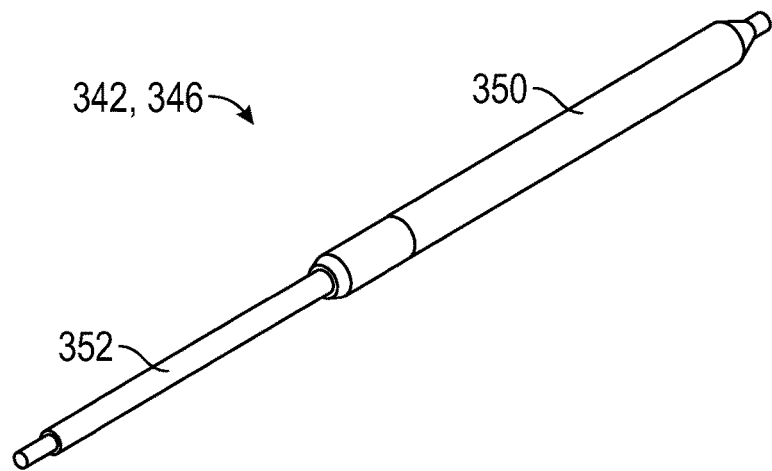
FIG. 10 is a perspective view of one of the gas struts of FIG. 9, according to an exemplary embodiment.

With specific reference to FIGS. 9 and 10, the hood assembly 300 includes a plurality of gas struts, each being coupled to an inner surface of the first hood 306 or the second hood 308. Specifically, the hood assembly 300 includes a first pair of gas struts 342 coupled to a first inner surface 344 of the first hood 306, and a second pair of gas struts 346 coupled to a second inner surface 348 of the second hood 308. The first pair of gas struts 342 are laterally separated from one another. In some embodiments, the opposing ends of the first pair of gas struts 342 (i.e., the ends that are not coupled to the first inner surface 344) are coupled to the cooling plate 328 or the frame 12. The second pair of gas struts 346 are laterally separated from one another. In some embodiments, the opposing ends of the second pair of gas struts 346 (i.e., the ends that are not coupled to the second inner surface 348) are coupled to the support beam 330 (e.g., to the distal ends of the lateral portion 332).

Each of the first pair of gas struts 342 and the second pair of gas struts 346 includes a cylinder 350 and a piston rod 352 that is configured to extend from and retract into the cylinder 350. The cylinder 350 is filled with a compressed gas (e.g., nitrogen) that acts on a piston that is coupled to the piston rod 352 within the cylinder 350. The compressed gas within the cylinder 350 applies a force on the piston rod 352 that holds the first hood 306 or the second hood 308 in an open position. Additionally, the compressed gas within the cylinder 350 also provides a damping force to the first hood 306 or the second hood 308 as it is pivoted from the open position to the closed position. In general, the smaller size and weight defined by the first hood 306 and the second hood 308 (e.g., relative to a conventional single-piece hood) enable low-cost gas struts to be incorporated into the hood assembly 300 for supporting the first hood 306 and the second hood 308, for example, in the open position. Additionally, the smaller size and weight of the first hood 306 and the second hood 308 reduces or eliminates a need to reinforce the inner surfaces of the first hood 306 and the second hood 308 in the regions where the gas struts 342, 346 are coupled thereto, which further reduces a cost and complexity associated with the hood assembly 300.

Figure 11:
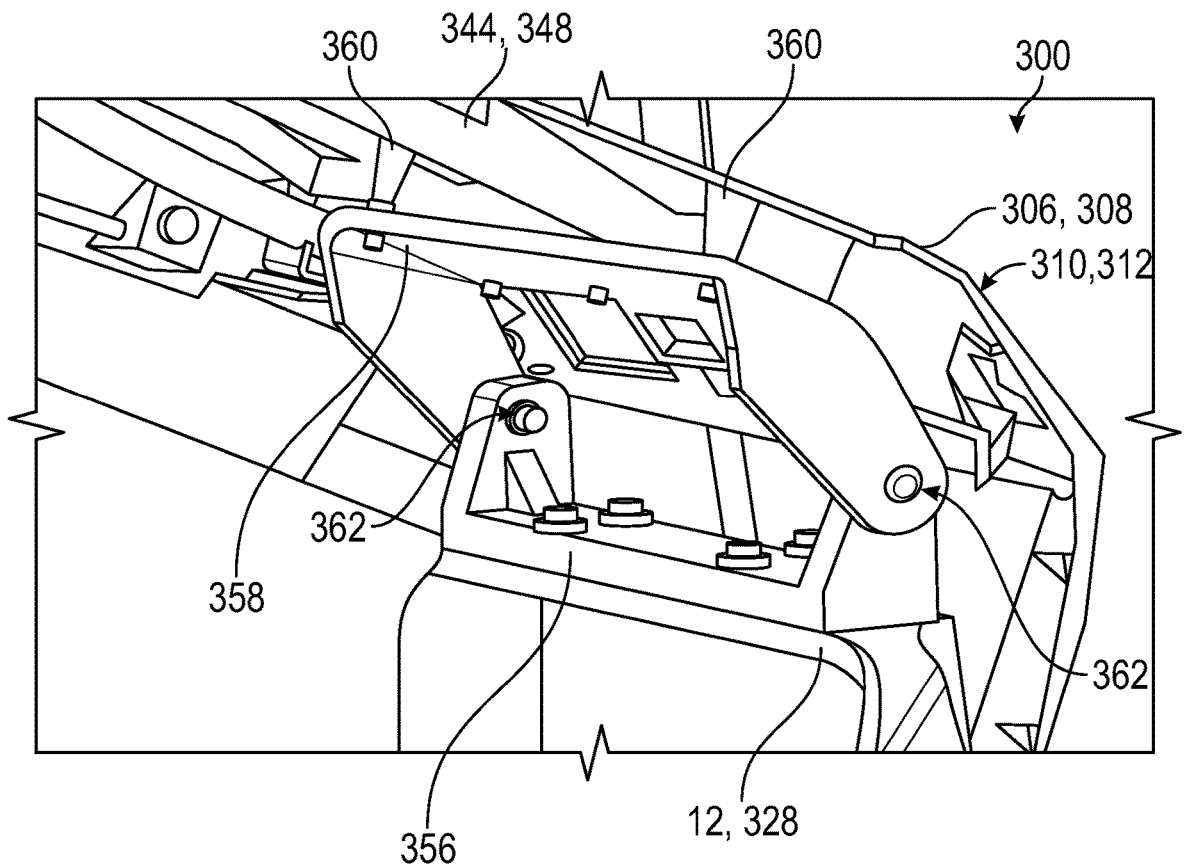
FIG. 11 is a perspective view of a hinge assembly of the vehicle of FIG. 4, according to an exemplary embodiment.

As described herein, the first hood 306 is pivotally coupled to the frame 12 by the first hinge assembly 310 and the second hood 308 is pivotally coupled to the frame 12 by the second hinge assembly 312. FIG. 11 illustrates an exemplary embodiment of a hinge assembly that is representative of both the first hinge assembly 310 and the second hinge assembly 312. That is, the following description of the hinge assembly applies equally to both the first hinge assembly 310 and the second hinge assembly 312, except as otherwise described herein. In the illustrated embodiment, the first hinge assembly 310 and the second hinge assembly 312 each include includes a mounting bracket 356 and a pivot bracket 358. In the first hinge assembly 310, the pivot bracket 358 is pivotally coupled between the mounting bracket 356 and the first hood 306, and the mounting bracket 356 is coupled to the frame 12 (e.g., via one or more fasteners, such as bolts, screws, rivets, welds, etc.). In the second hinge assembly 312, the pivot bracket 358 is pivotally coupled between the mounting bracket 356 and the second hood 308, and the mounting bracket 356 is coupled to the cooling assembly frame 326 (e.g., to a top end of the cooling plate 328 via one or more fasteners, such as bolts, screws, rivets, welds, etc.), which is coupled to the frame 12.

The first hood 306 and the second hood 308 each include one or more mounting arms 360 that extend outwardly from the respective one of the first inner surface 344 or the second inner surface 348. Each of the mounting arms 360 is coupled to the pivot bracket 358 by a fastener (e.g., a bolt, a screw, a rivet, etc.). In the illustrated embodiment, the pivot bracket 358, and thereby the respectively one of the first hood 306 and the second hood 308 coupled thereto, is configured to pivot relative to the mounting bracket 356, and thereby relative to the frame 12, using one or more coupling assemblies 362. In the illustrated embodiment, a pair of coupling assemblies 362 are coupled between the mounting bracket 356 and the pivot bracket 358. In some embodiments, more or less than two coupling assemblies 362 may be coupled between the mounting bracket 356 and the pivot bracket 358.

Figure 12:
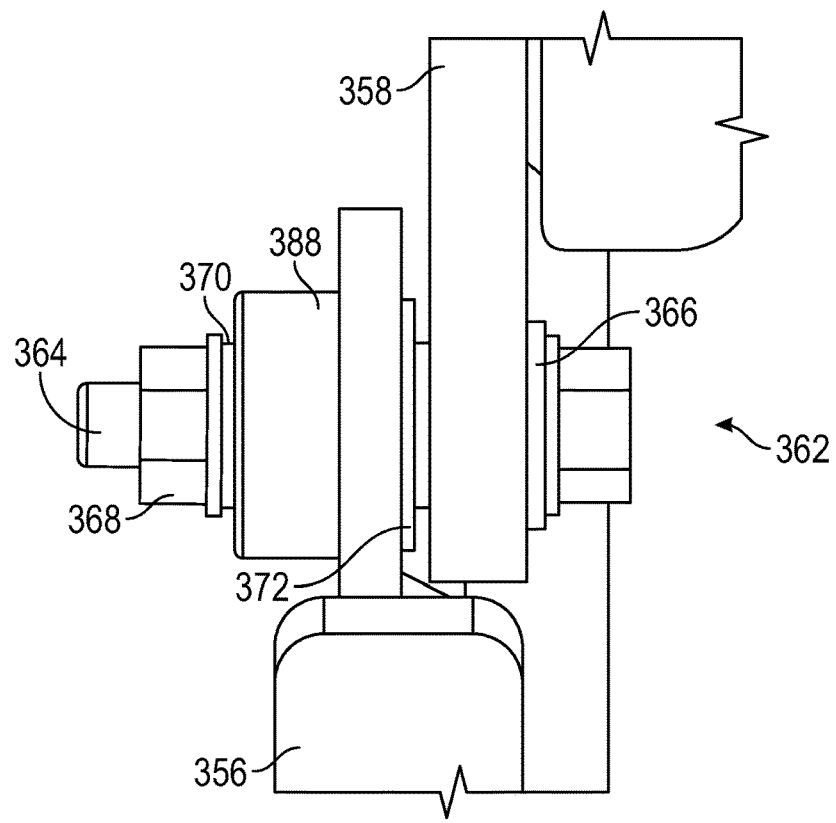
FIG. 12 is a front view of a hinge coupling of the hinge assembly of FIG. 11, according to an exemplary embodiment.
Figure 13:
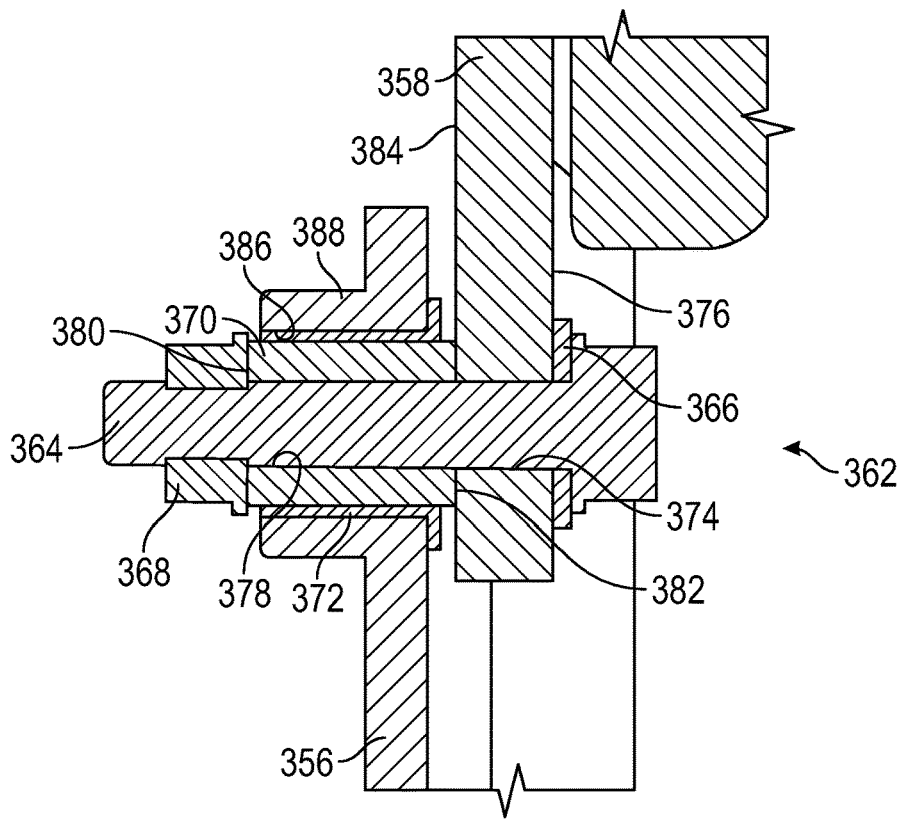
FIG. 13 is a section view of the hinge coupling of FIG. 12.

With specific reference to FIGS. 12 and 13, each of the coupling assemblies 362 includes a bolt or shaft 364, a washer 366, a nut 368, a spacer tube 370, and a busing or bearing 372. The bolt 364 extends through an aperture 374 formed in the pivot bracket 358 and the washer 366 is arranged between a head of the bolt 364 and an outer surface 376 of the pivot bracket 358. The bolt 364 also extends through an inner bore 378 defined by the spacer tube 370. The nut 368 is coupled to an end of the bolt 364 arranged opposite to the head of the bolt 364. The nut 368 engages a first axial end 380 of the spacer tube 370 and the second axial end 382 (opposite to the first axial end) of the spacer tube 370 engages an inner surface 384 of the pivot bracket 358. The nut 368 is configured to be tightened so that the pivot bracket 358, the bolt 364, and the spacer tube 370 are rotationally coupled to one another (e.g., rotation of the pivot bracket 358 results in rotation of the bolt 364 and the spacer tube 370. The spacer tube 370 defines an axial length that ensures that an axial gap is formed between the inner surface 384 of the pivot bracket 358 and the mounting bracket 356. The axial gap avoids engagement between the mounting bracket 356 and the pivot bracket 358 as the pivot bracket 358 pivots relative to the mounting bracket 356.

The bearing or bushing 372 extends through an aperture 386 formed in a mounting flange 388 of the mounting bracket 356. The mounting flange 388 is arranged radially outwardly (e.g., relative to a center axis extending through the bolt 364) from the spacer tube 370, and the bearing or bushing 372 is arranged radially between the spacer tube 370 and the mounting flange 388. The bushing or bearing 372 is configured to allow relative rotation between the mounting flange 388 and the spacer tube 370, which, in turn, allows relative rotation between the mounting bracket 356 and the pivot bracket 358. For example, as the pivot bracket 358 is pivoted, a torque is applied to the bolt 364 that causes the bolt 364 and the spacer tube 370 to rotate. The bushing or bearing 372 allows the bolt 364 and the spacer tube 370 to rotate relative to the mounting flange 388, which allows the pivot bracket 358 to pivot or rotate relative to the mounting bracket 356.

In some embodiments, the first hood 306 and the second hood 308 may be selectively moved from the closed position to the open position by a user manipulating a latch and manually opening the first hood 306 or the second hood 308. In some embodiments, the first hood 306 and the second hood 308 may be electrically operated, for example, using one or more linear actuators (e.g., electrical linear actuators). Turing to FIG. 14, in some embodiments, the hood assembly 300 includes one or more first actuators 390 that are coupled to the first hood 306 and one or more second actuators 392 that are coupled to the second hood 308. The first actuators 390 are configured to selectively pivot the first hood 306 between the first closed position and the first open position, and the second actuators are configured to selectively pivot the second hood 308 between the second closed position and the second open position.

The first actuators 390 and the second actuators 392 are in communication with a controller 394. In some embodiments, the controller 394 is incorporated into the control system 200 of the vehicle 10. The controller 394 includes a processing circuit 396 having a processor 398 and memory 400. The processing circuit 396 can be communicably connected to a communications interface such that the processing circuit 396 and the various components thereof can send and receive data via the communications interface. The processor 398 can be implemented as a general purpose processor, an application specific integrated circuit ("ASIC"), one or more field programmable gate arrays ("FPGAs"), a group of processing components, or other suitable electronic processing components.

The memory 400 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 400 can be or include volatile memory or non-volatile memory. The memory 400 can include database components, object code components, script components, or any other type of information structure for supporting the various activities and information structures described in the present application. According to some embodiments, the memory 400 is communicably connected to the processor 398 via the processing circuit 396 and includes computer code for executing (e.g., by the processing circuit 396 and/or the processor 398) one or more processes described herein.

In some embodiments, the controller 394 is in communication with a first input 402 and a second input 404. The first input 402 and the second input 404 may be in the form of a touchscreen, a button, a switch, a dial, a knob, or any other input capable of being manipulated by an operator. The first input 402 is configured to control operation of the first actuators 390. For example, an operator may manipulate the first input 402 to selectively open or close the first hood 306. Similarly, the second input 404 is configured to control operation of the second actuators 392 so that an operator may manipulate the second input 404 to selectively open or close the second hood 308.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. An off-road vehicle, comprising:
   a frame coupled to a tractive assembly;
   a cab supported on the frame; and
   a hood assembly coupled to the frame, the hood assembly including:
      a first hood coupled to the frame by a first hinge assembly that defines a first pivot axis; and
      a second hood spaced from the first hood along a longitudinal direction and coupled to the frame by a second hinge assembly that defines a second pivot axis, wherein the first hood is configured to pivot about the first hinge assembly independent of the second hood, wherein the second hood is configured to pivot about the second hinge assembly independent of the first hood, wherein the first pivot axis and the second pivot axis are both arranged perpendicular to the longitudinal direction, and the first hood and the second hood pivot in the same direction when pivoting from a closed position to an open position.

2. The off-road vehicle of claim 1, wherein the first hinge assembly is arranged closer to the cab than the second hinge assembly.

3. The off-road vehicle of claim 1, wherein the first hood is configured to selectively cover an engine.

4. The off-road vehicle of claim 3, wherein the first hood is configured to selectively pivot between the open position where access is provided to the engine and the closed position where the engine is at least partially enclosed by the first hood.

5. The off-road vehicle of claim 1, wherein the second hood is configured to selectively cover a cooling assembly.

6. The off-road vehicle of claim 5, wherein the second hood is configured to selectively pivot between the open position where access is provided to the cooling assembly and the closed position where the cooling assembly is at least partially enclosed by the second hood.

7. The off-road vehicle of claim 1, wherein the first hinge assembly includes a mounting bracket coupled to the frame and a pivot bracket pivotally coupled between the mounting bracket and the first hood.

8. The off-road vehicle of claim 1, wherein the second hinge assembly includes a mounting bracket coupled to a cooling assembly frame and a pivot bracket pivotally coupled between the mounting bracket and the second hood, and wherein the cooling assembly frame is coupled to the frame.

9. The off-road vehicle of claim 1, further comprising a first pair of gas struts coupled to a first inner surface of the first hood, and a second pair of gas struts coupled to a second inner surface of the second hood.

10. The off-road vehicle of claim 1, further comprising a first linear actuator coupled to the first hood and configured to selectively pivot the first hood from the closed position to the open position, and a second linear actuator coupled to the second hood and configured to selectively pivot the first hood from the closed position to the open position.

11. An off-road vehicle, comprising:
a frame coupled to a tractive assembly and defining a front end and a rear end that are spaced along a longitudinal direction;
a cab supported on the frame;
a cooling assembly arranged adjacent to the front end;
an engine arranged between the cooling assembly and the cab; and
a hood assembly coupled to the frame, the hood assembly including:
a first hood pivotally coupled to the frame about a first pivot axis and configured to selectively cover the engine; and
a second hood pivotally coupled to the frame about a second pivot axis and configured to selectively cover the cooling assembly, wherein the first pivot axis and the second pivot axis are both arranged perpendicular to the longitudinal direction, and the first hood and the second hood pivot in the same direction when pivoting from a closed position to an open position.

12. The off-road vehicle of claim 11, wherein the first hood is pivotally coupled to the frame by a first hinge assembly that includes a mounting bracket coupled to the frame and a pivot bracket pivotally coupled between the mounting bracket and the first hood.

13. The off-road vehicle of claim 11, wherein the second hood is pivotally coupled to the frame by a second hinge assembly that includes a mounting bracket coupled to a cooling assembly frame and a pivot bracket pivotally coupled between the mounting bracket and the second hood, and wherein the cooling assembly frame is coupled between the mounting bracket and the frame.

14. The off-road vehicle of claim 11, further comprising a first pair of gas struts coupled to a first inner surface of the first hood, and a second pair of gas struts coupled to a second inner surface of the second hood.

15. An off-road vehicle, comprising:
a frame coupled to a tractive assembly;
a cab supported on the frame;
an engine bay defining a first section and a second section, the first section being arranged closer to the cab than the second section; and
a hood assembly including:
a first hood pivotally coupled to the frame so that the first hood is configured to selectively pivot about a first pivot axis between a first open position where access is provided to the first section and a first closed position where the first section is at least partially enclosed by the first hood; and
a second hood spaced from the first hood along a longitudinal direction and pivotally coupled to the frame so that the second hood is configured to selectively pivot about a second pivot axis between a second open position where access is provided to the second section and a second closed position where the second section is at least partially enclosed by the second hood, wherein the first pivot axis and the second pivot axis are both arranged perpendicular to the longitudinal direction, and the first hood and the second hood pivot in the same direction.

16. The off-road vehicle of claim 15, wherein the first hood is pivotally coupled to the frame by a first hinge assembly that includes a mounting bracket coupled to the frame and a pivot bracket pivotally coupled between the mounting bracket and the first hood.

17. The off-road vehicle of claim 15, wherein the second hood is pivotally coupled to the frame by a second hinge assembly that includes a mounting bracket coupled to a cooling assembly frame and a pivot bracket pivotally coupled between the mounting bracket and the second hood, and wherein the cooling assembly frame is coupled between the mounting bracket and the frame.

18. The off-road vehicle of claim 15, further comprising a first pair of gas struts coupled to a first inner surface of the first hood, and a second pair of gas struts coupled to a second inner surface of the second hood.

* * * * *